United States Patent [19]
Caumanns

[11] Patent Number: 5,018,270
[45] Date of Patent: May 28, 1991

[54] PROCESS AND APPARATUS FOR ASSEMBLING AN ELECTRICAL CONNECTOR ONTO TWO ELECTRIC WIRES

[75] Inventor: Fritz Caumanns, Radevormwald, Fed. Rep. of Germany

[73] Assignee: Grote & Hartmann GmbH & Co. KG, Wuppertal, Fed. Rep. of Germany

[21] Appl. No.: 417,515

[22] Filed: Feb. 5, 1989

[30] Foreign Application Priority Data

Oct. 10, 1988 [DE] Fed. Rep. of Germany ....... 3834455
Mar. 17, 1989 [DE] Fed. Rep. of Germany ....... 3908867

[51] Int. Cl.[5] ........................ H01R 43/04; B23P 19/00
[52] U.S. Cl. ........................................ 29/863; 29/748; 29/749; 29/753
[58] Field of Search ................. 29/748, 753, 863, 864, 29/865, 866, 867, 749

[56] References Cited

U.S. PATENT DOCUMENTS 3,239,924 3/1966 Wagner ................................ 29/753
4,587,725 5/1986 Ogawa et al. ......................... 29/753
4,654,952 4/1987 Baldyga ............................... 28/753
4,691,437 9/1987 Vaglini ................................ 29/753
4,815,200 3/1989 Ito ......................................... 29/863

*Primary Examiner*—P. W. Echols
*Attorney, Agent, or Firm*—Goodman & Teitelbaum

[57] ABSTRACT

The invention relates to a process and to an apparatus for assembling an electrical connector onto two electric wires. The electrical connector is formed from a sheet metal stamping part, having a contact portion and a claw portion, the claw portion having insulation and strand claws, in which two electric lines are each insulated in an end portions, the end portion being arranged adjacent to one another so that the end portions are crimped in the insulation and strand claws. The connectors are arranged in the form of a band in which the connectors are connected together by stamping strips, and the lines are fed adjacent to one another to a crimping tool. The first connector of the band to be crimped and the ends of the lines are positioned under the crimping tool, thereupon—simultaneously during the crimping process—the crimped connector is separated from the band, and the claws of the following connector in the band are opened up.

34 Claims, 6 Drawing Sheets

PROCESS AND APPARATUS FOR ASSEMBLING AN ELECTRICAL CONNECTOR ONTO TWO ELECTRIC WIRES

For the formation of double stops, in the insulation claw and the wire claw of an electrical connector formed from a sheet metal stamped part, two electric lines of equal thickness and insulated in the end portion are crimped together. There, for the assurance of an optimal bearing of the lines and an optimal contacting of the wires of the lines, as a rule consisting of strands, with the electrical connector it is required that in the crimp the two lines be arranged parallel in contact adjacently to one another in a plane, and that the wires be arranged insofar as possible in the longitudinal axial direction of the lines. This requirement is frequently unfulfilled. The lines are more or less twisted, and the wires are spirally twisted or bent, in which process some strands can be torn off. These faults arise in the crimping mostly when the claws of the connector are too narrow for the introduction of the lines.

In order, in the case of double stops, to obviate the faults mentioned, connectors meant for single stops have been used, the claws of which are laid out for a larger line section and, accordingly, they have further-opened claws from the outset. The form and the opening-up of the claws, however, are only in the rarest cases such that an optimal crimp can be assured for a double stop. Moreover, the connector with the wider claws is laid out overall with larger dimensions, and these larger dimensions are mostly undesired. On the contrary, as a rule it is desired to have the same connectors with single and with double stops available, and to install them in the chambers of a casing, which chambers have equal dimensions and into which chambers no larger connectors are installable. Furthermore, the stocking of connectors for double stops is to be increased correspondingly, so that altogether a double stop causes considerable costs.

The problem of the invention is to present a process and an apparatus with which, in a simple manner, optimal double stops can be produced.

This problem is solved by the features of the present invention set forth below. Advantageous further developments of the invention are also described below.

In particular, through the feature that the invention is realized by an accessory arrangement for stop or crimping machines, in which in the crimping simulatneously the claws of the following connector are opened up, or the clear spacing of the claw arms is enlarged, it is possible, with simple means, to construct double stops with optimal spatial form and with optimal electrical properties.

Figure 1:
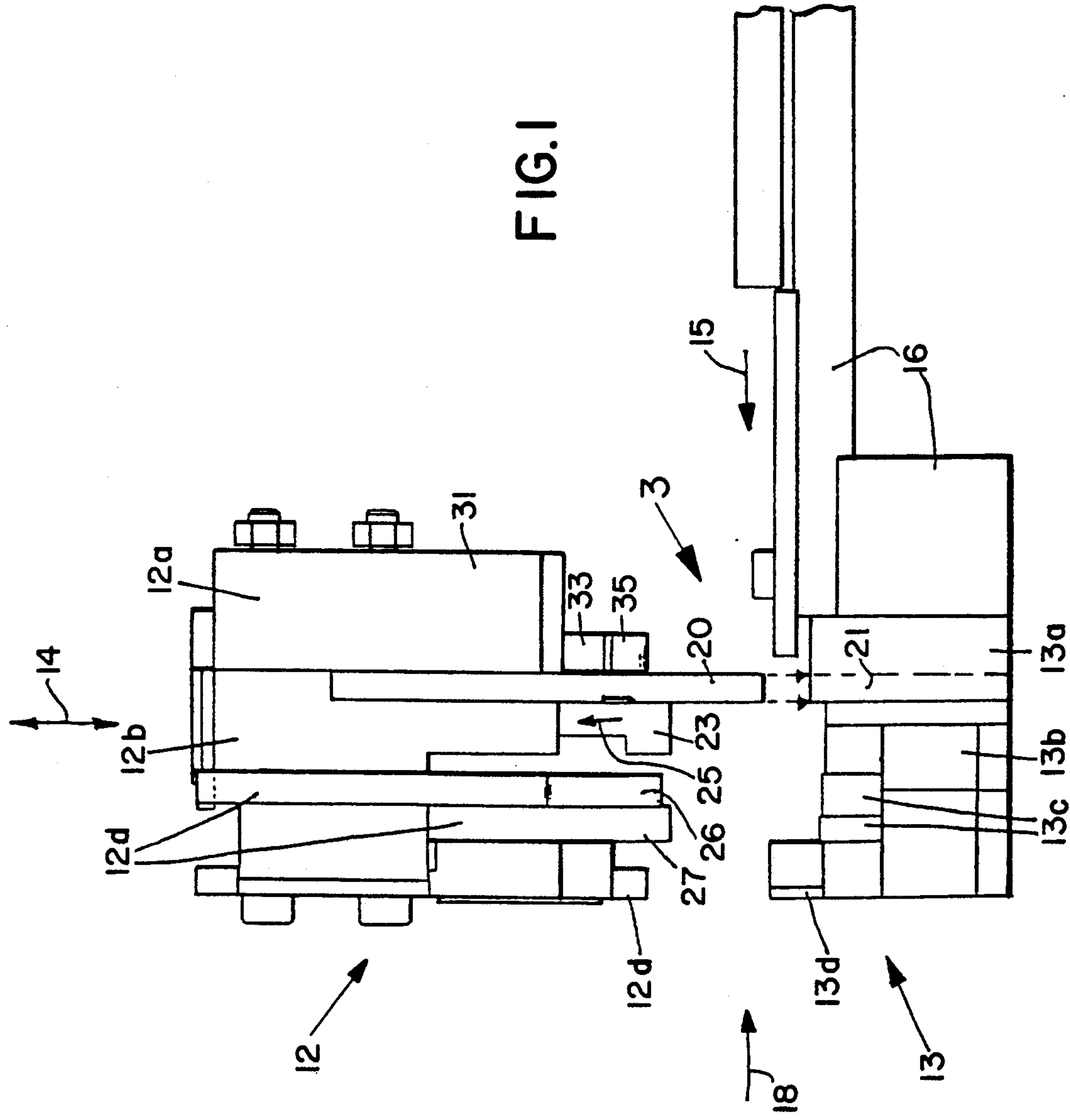
Figure 2:
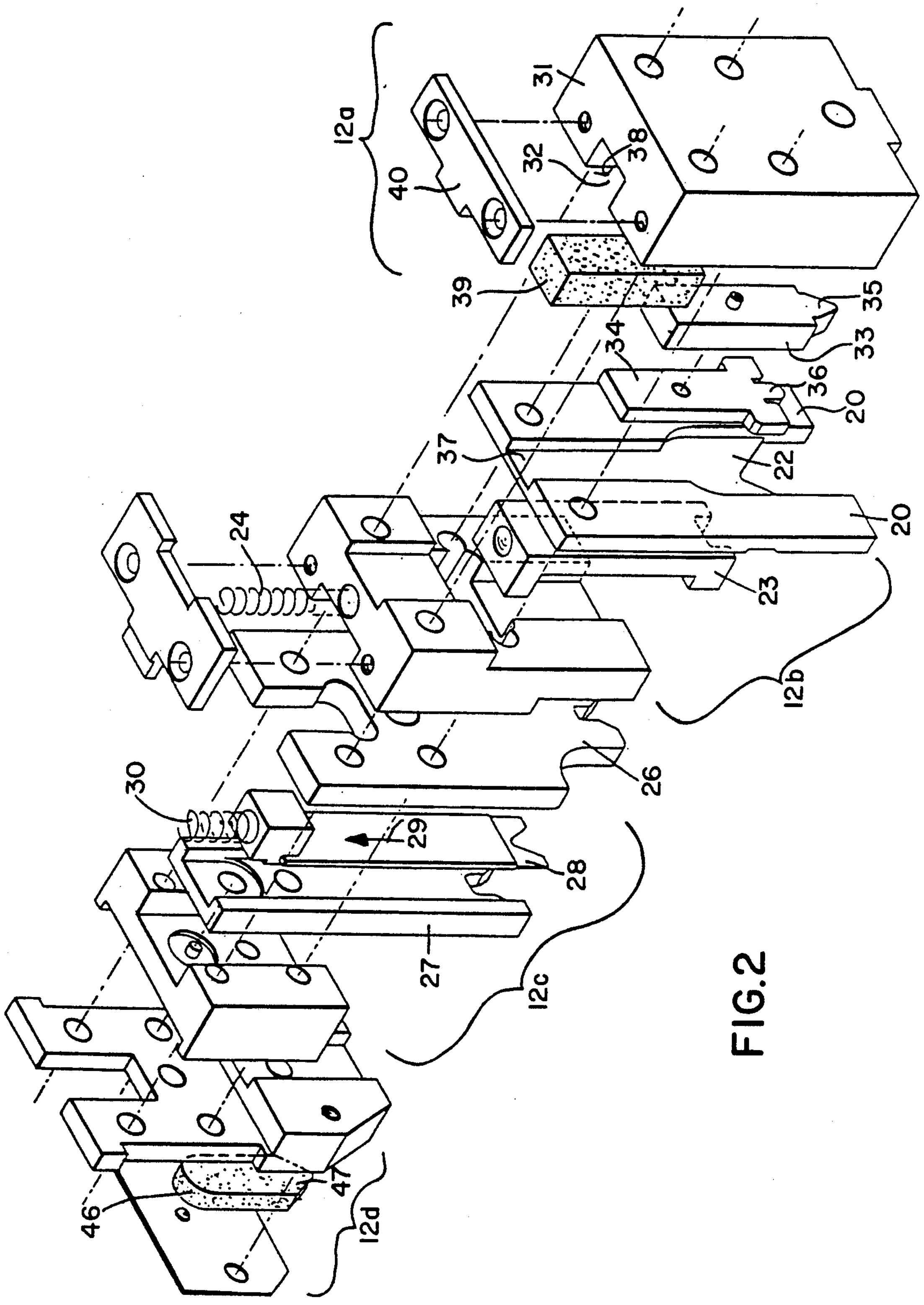
Figure 3:
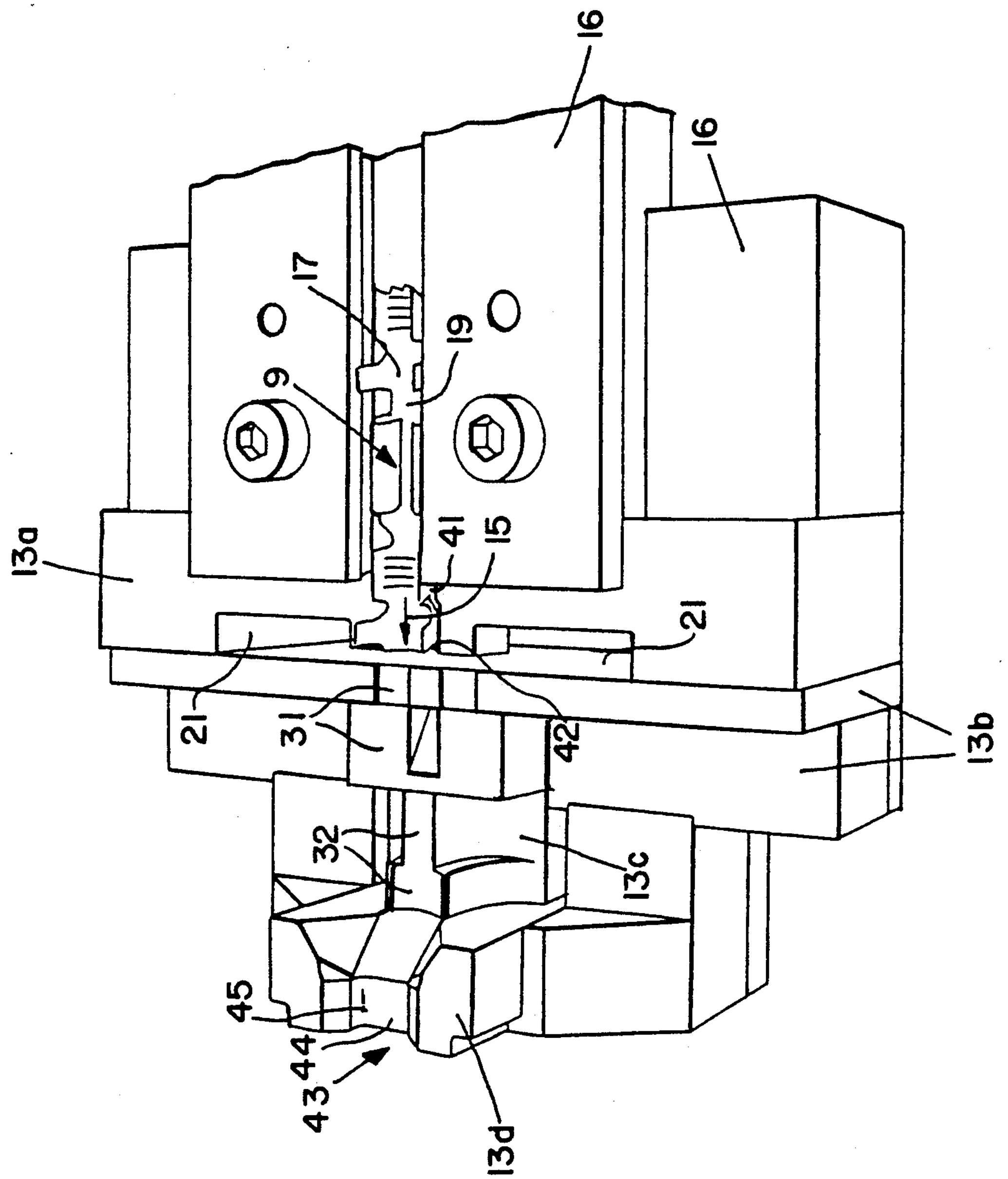
Figure 4:
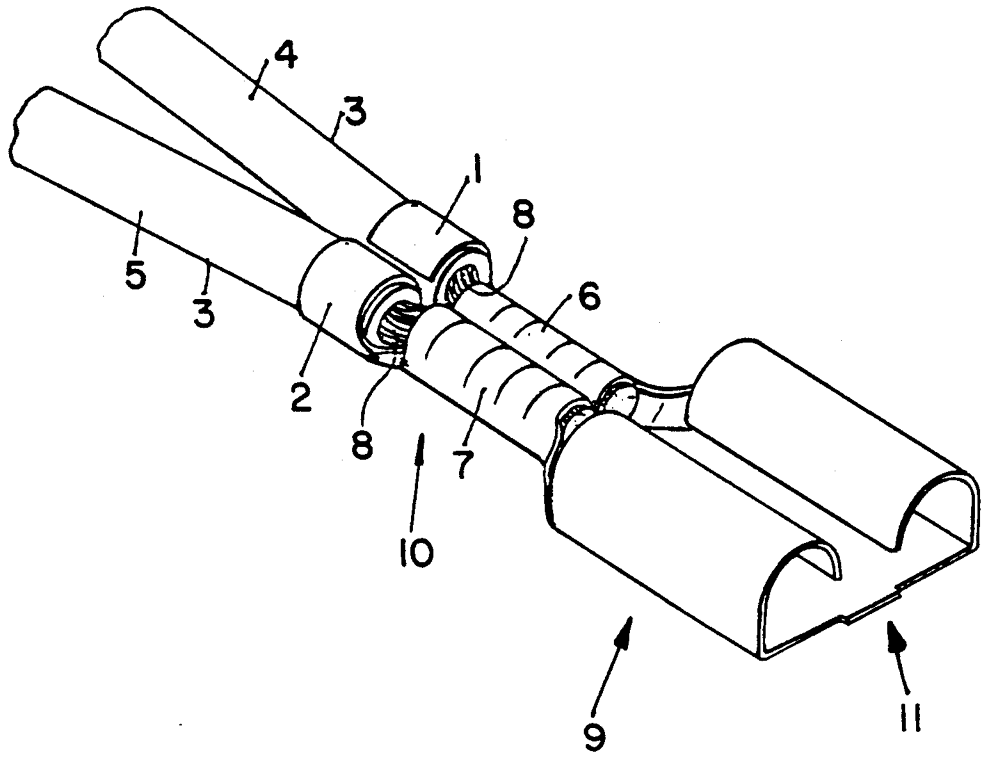
Figure 5:
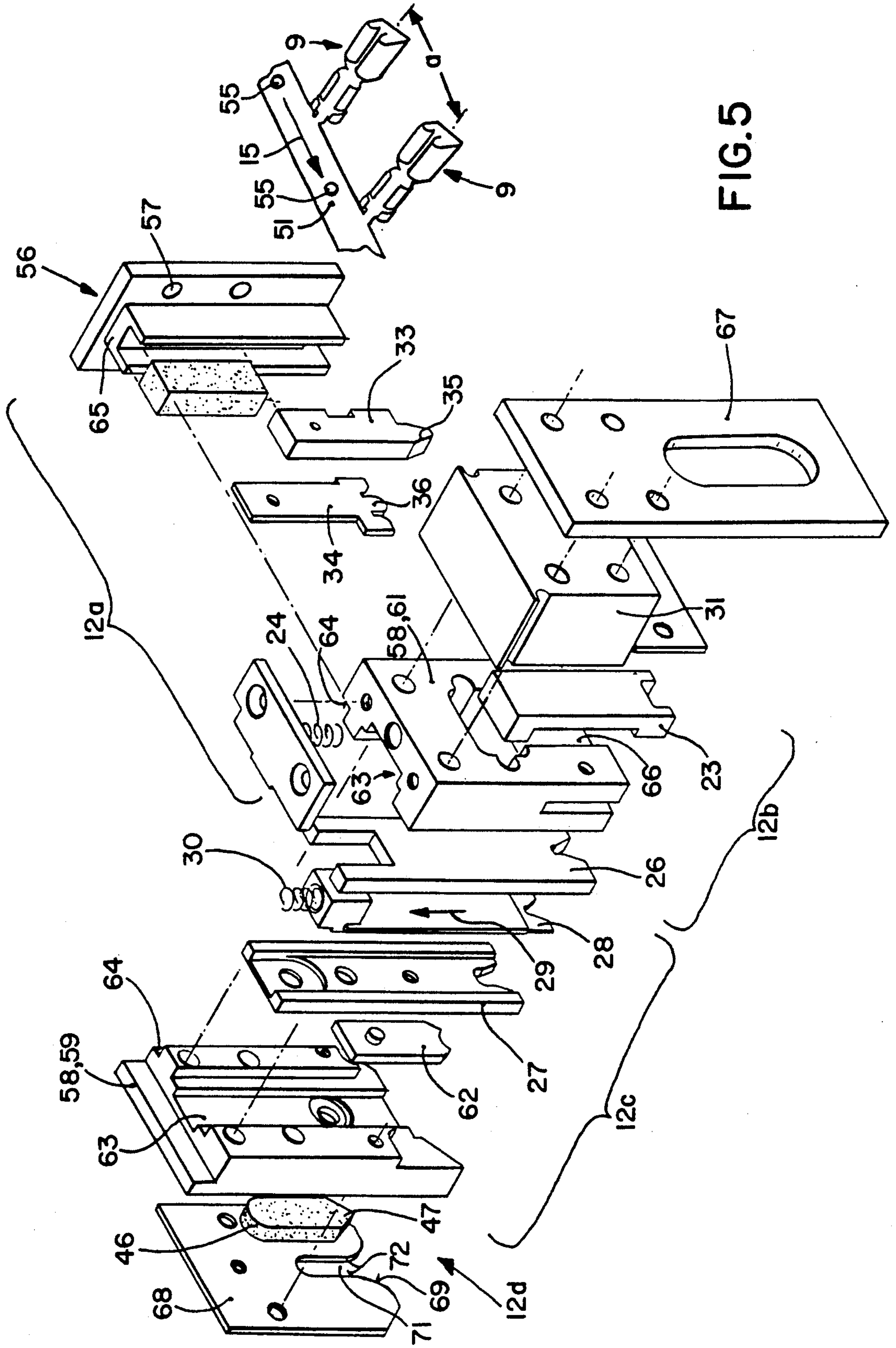
Figure 6:
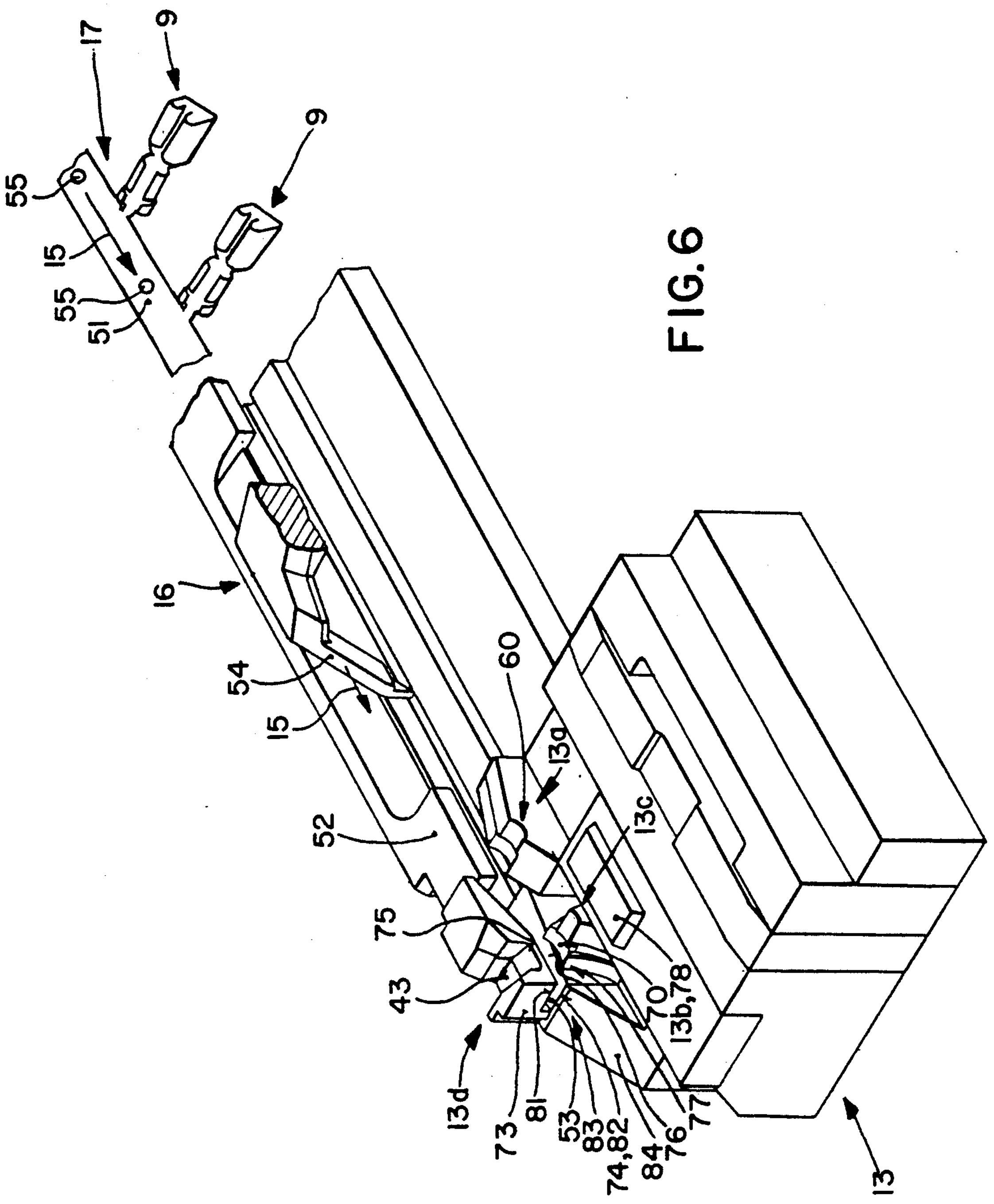

In the following description the invention is explained in detail with the aid of preferred examples of execution represented in the drawings, in which: FIG. 1 shows an accessory arrangement for a stop machine with a design according to the invention in side view; FIG. 2 shows a perspective exploded representation of the upper part of the accessory arrangement shown in FIG. 1; FIG. 3 shows in perspective a plan view of the lower part of the accessory arrangement as viewed in the direction arrow III in FIG. 1; FIG. 4 shows in perspective a double stop; FIG. 5 shows a perspective exploded representation of the upper part of an accessory arrangement of a second embodiment of the invention and FIG. 6 shows a perspective plan view of the lower part of the accessory arrangement of the second embodiment for association with the upper part shown in FIG. 5.

For the formation of a double stop on an electrical connector 9 having a claw portion 10 and a contact portion 11 (FIG. 4), there is struck in each case an insulation claw arm 1, 2 of the connector 9 onto the insulation sheath 3 in each case, of an electrical line 4, 5, while the wire claw arms 6, 7 of the connector 9 embrace in each case the wire 8 of the electric lines 4, 5 with electrically contacting effect. In an optimal crimp the lines 4, 5 in the area of the insulation claw lie adjacent and contacting each other in a plane. The wires 8 are possibly bent somewhat to the longitudinal middle of the connector, but run likewise parallel to one another in a plane. The strands are not twisted or torn off. The wires 8 lie approximately in the plane in which the longitudinal axes of the lines 4, 5 are present (not represented), that is to say, they are not bent downward.

Such an optimal double stop is producible by the process of the invention, and with the apparatus according to the invention, which is preferably constructed as an accessory arrangement or as a so-called follower tool. There, it is essential that the stroke for the crimping be utilized for the simultaneous opening up of the claw arms of the electrical connector following in the crimping process for the next crimp.

The crimping takes place, as is well known, by machine, in a process such that the connectors and the lines are fed to the crimping tools of a stop machine, the connectors being fed from a roll on which there are rolled the connectors joined in band form together with one another by a material web. Before the crimping, the end portion of the line to be crimped is insulated and then in the crimping tool the line is crimped to the connector, the material web being simultaneously severed, so that the connector is separated from the connector band.

It is a known practice to arrange the crimping tools in stop machines changeably, so that with the stop machine various connectors can be processed. Likewise it is a known practice to provide accessory arrangements, for example insulating devices, for stop machines, which are insertable into the stop machine. The invention makes use of this technology, inter alia, for the solution of the problem posed according to the invention.

The accessory arrangement according to the invention includes an upper part 12 and a lower part 13. The lower part 13 is insertable into the base part of the stop machine, while the upper part 12 is connected with the drivable up and down stamp of the stop machine (not represented) and, accordingly, is drivable in the direction of the double-arrow 14 (FIG. 1).

Connectors 9 in the form of a band 17 are fed to the new accessory arrangement the direction of arrow 15 with a pusher arrangement 16 in a manner known per se. From the opposite direction (arrow 18) there are supplied the two lines 4, 5 lying next to one another in a plane (not represented).

The upper and lower part(s) 12, 13, which are composed of many individual parts include, in each case arranged in succession in connector feed (arrow direction 15), lying opposite one another an opening-up station **12*a*, 13*a*, a contact area bearing station 12*b*, 13*b*, a crimping station 12*c*, 13*c* and a guide arrangement 12*d*, 13*d* for the lines 4, 5**.

The spatial arrangements, the corresponding surface space forms as well as the functions of the stations 13*b* and 13*c* may correspond to usual forms of execution and do not need to be described in detail. Likewise, it is usual practice to combine such stations with guides and with a separating knife for the severing of the material web 19 in the connector band 17. In the accessory arrangement of the invention there are arranged vertically downward-extending guide bars (20) laterally spaced from one another on the upper part 12, which can slide in closed linkage in recesses 21 in the lower part 13. Between the guide bars 20 there is arranged a separating knife or knife carrier 22 which cuts out the material web 19 from the connecting band 17 in the crimping, so that the crimped connector is individualized and can be taken from the accessory arrangement after the opening of the tool.

The bearing station 12*b* includes a vertically downward-extending holding stamp 23, which can yield upward against a spring 24 in the direction of arrow 25, so that the contact area is supported, about in closed linkage, by the holding stamp 23, but is not deformed when the tool travels further downward for the crimping.

The crimping station 12*c*with the two crimping stamps 26, 27 includes a vertically downward-extending centering stamp 28 which can yield between the two stamps 26, 27 in the direction of arrow 29 against the pressure of a spring 30 when the tool travels further downward and, in the process, holds the connector centered for the crimping.

The counter-bearings 13*b*, 13*c* of the bearing station 12*b* and of the crimping station 12*c* are formed as usual and cooperate in a manner known per se with the corresponding elements of the upper part 12.

The essential substance of the invention lies in the arranging on the inlet side of the opening-up station 12*a*, 13*a* and the formation of this station.

The opening-up station 12*a* includes a slab-form bearing block 31 with a vertical U-shaped slide groove 32, in which, arranged in succession in the direction of arrow 15, there are borne to slide vertically a strand claw opening-up stamp 33 and an insulation claw opening-up stamp 34. The strand claw opening-up stamp 33 terminates below in a wedge-shaped point 35, the wedge angle of which corresponds to the opening-up angle for the strand claw. The insulation claw opening-up stamp 34 ends below with a rounded pin-type crosspiece 36, the outer contour of which has the opening-up contour of the insulation claw.

The groove 32 is covered with a side wall of the knife-carrier 22, so that a guide shaft closed on all sides results, in which there are guided the stamps 33, 34. There the stamp 34 can be fitted expediently into a groove 37 of the knife carrier 22, the grooves 32 and 37 being disposed adjacent each other to form the guide shaft. The stamps 33, 34 are made only about half as long as the length of the guide shaft, and are borne in such a way that downward, say, only the point 35 and the crosspiece 36 protrude from the guide shaft. The remaining upper shaft space 38 is filled with a spring element, preferably a plastic plug 39 of a rubber-elastic material, the guide shaft being covered at the top with a cover 40 so that the plug 39 acts against the stamps 33, 34 and the cover 40. The spring element assures a certain force which in the opening-up acts on the material of the claws. On exceeding of the force, the spring stamps are retrained for a distance within the guide shaft against the spring force, so that the material of the claws is not solidified or impressed. An uncontrolled solidification would affect the crimping; for solidified material would require increased crimping forces. If these increased crimping forces are not available the crimp can become defective.

The stamps 33, 34 are secured against dropping out of the guide shaft by usual means (not represented).

Opposite the point 35 and the crosspiece 36 the opening-up station 13*a* has in each case a trough 41, 42 as countersupports, which together with the point 35 and the crosspiece 36 provide the opening-up tool, the point 35 and the trough 41 serving for the opening up of the insulation claw. The surface contours of these parts, accordingly, are attuned to one another.

According to a supplementary form of execution of the invention the guide arrangement 13*d* presents a trough 43 with a flat bottom 44 and vertical lateral flanks 45. The lines 4, 5 can be supported resting on the flat bottom in the trough 43, and, namely, at a defined lateral spacing, for which there serves a presser 46 which is arranged in the guide arrangement 12*d*. The presser consists of a rubber-elastic material and has a vertically downward-pointing wedge-shaped point 47 which engages between the lines 4, 5 when the upper part 12 is driven downward for the crimping and opening-up. Since the presser 46 consists of elastic material, it adjusts to the way that the crimping tool travels further downward by elastic deformation, in which process the lines 4, 5 are pressed against the vertical or upward-diverging flanks 45 of the trough 43 and thus fixed.

It is self-evident that the individual tool parts are arranged successively in alignment in working direction of arrow 15 or 18, so that the tool can function faultlessly. The individual tool parts are preferably arranged changeably in the upper or lower part, so that in the changing of the connector type and/or the line cross sections, the tool parts can be changed. To this extent, as is to be seen especially from FIG. 2, upper and lower parts are constructed of many individual parts that can be exchanged for other parts of like spatial form which are fitted with other individual tools.

With the invention it is possible, accordingly, to use connectors in the form of conventional trade ware for double stops in the same manner they are also used with like connectors for single stops. Special ware is not required. Neither is it necessary any longer to use any ware of larger dimensions for double stops than for single stops.

In the embodiment according to FIGS. 5 and 6, which is fundamentally comparable with the previously described example of execution, like or comparable parts of the apparatus are designated with the same reference numbers. In this second example of execution, too, the apparatus has an opening-up station 12*a*, 13*a*, a contact area bearing station 12*b*, 13*b*, a crimping station 12*c*, 13*c* and a guide arrangement 12*d*, 13*d* for the lines 4, 5, the individual parts of these stations being substantially comparable with the individual parts of the stations of, the first example of execution.

The apparatus according to FIGS. 5 and 6 is arranged for crimping lines 4, 5 onto the claws of connectors 9 which are joined according to FIGS. 5 and 6 on the face side, in the present embodiment the face side being on the claw side, over a stamping section with a continuous strip 51, in which the connectors 9 have an axial spacing a from one another. The shifting arrangement 16 here has a guide rail 52 with a horizontal guide groove 53 open on the inside, in which the strip 51 is slidable forward with play in the connector feed direction 15 (arrow 15) by means of a finger-form feed element 54 suggested in the drawing. The feed element 54 is capable of gripping in regularly arranged holes 55 in strip 51 and by shifting into the connector feed direction 15, advancing the strip 51 or the band 17 intermittently in each case by the measure of the spacing a. In the present embodiment, in the area of movement of the feed element 54, the guide rail 52 is recessed on the upper side, so that the feed element 54 arranged over the strip 51 is able to grip into the holes 55 in a simple manner.

In order to crimp connectors fed in this arrangement with the lines 4, 5 and simultaneously to be able to open up the claws of the preceding connector 9, the connectors 9 are fed in transversely to their longitudinal direction, in which system with respect to the guide arrangement **12*d*, 13*d* for the lines 4, 5, the connector feed direction 15 runs transversely or at a right angle to the previously described first embodiment or with respect to a given connector feed direction 15, the guide arrangement 12*d*, 13*d* for the lines 4, 5 in the present example of execution is arranged laterally. There the guide arrangement 12*d*, 13*d* can be provided to the right or to the left of the connector feed direction 15. In the present embodiment, in which the claws of the connectors 9 are arranged on the right with respect to the connector feed direction 15, also the guide arrangement 12*d*, 13*d*** is arranged on the right.

FIG. 5 shows clearly that with respect to a given guide arrangement **12*d*, 13*d*, the connector feed direction 15 is turned horizontally 90° in comparison to the connector feed direction 15 of the first example of execution. For this reason in the embodiment according to FIGS. 5 and 6 the opening-up station 12*a*, 13*a* is turned through 90° and offset by 90° with respect to the crimping station 12*c*, 13*c* provided in like arrangement. There the two opening-up stamps 33, 34 are arranged laterally adjacent to one another with respect to the appertaining connector feed direction 15. For the bearing of the opening-up stamp 33 there serves a bearing block 56, which in the present embodiment is constructed in T-shape in horizontal cross section and is fastened by screws engaging in lateral holes 57 to the bearing block designated with 58 of the crimping station 12*c* in the upper part of the tool. As already in the first example of execution, here, too, the bearing block 58 consists of two bearing block halves 59, 61 which are put together on a dividing joint running vertically and at a right angle to the lines 4, 5 and are fastened together by means of fastening screws gripping through fastening holes (not represented). The crimping stamp 26 for the strand jaw, the centering stamp 28 and the crimping stamp 27 for the insulation sheath claw as well as a crimping stamp part 62 present in the example of FIGS. 5 and 6 additionally are borne in a vertical guide groove 63 of the bearing block 58 which extends into both bearing block halves 59, 61. On its side facing the opening-up station 12*a* the bearing block 58 includes a further vertical groove 64, which likewise extends into both bearing block halves 59, 61, and into which, when closing, grips the crosspiece part 65 of the bearing block 56** with closing effect and, accordingly, is laterally centered.

Since in the example of execution according to FIGS. 5 and 6, the bearing block 31 for the opening-up stamps 33, 34 is not needed, the bearing block 31 now serves as cover part for the function of securing the holding stamp 23 in the bearing block 58, which is arranged vertically slidable in a guide recess 66 open to this side.

On the outside of the bearing block 31 there is also fastened a plate-form guide element 67.

In contrast to the embodiment according to FIGS. 1 to 3, in the present example of execution in the cover plate 68, securing the presser 46 likewise arranged in a vertical guide groove, and fastened to the bearing block 58, there is provided a guide slit 71 for the lines 4, 5 emerging on the underside in the area of the roundings 69, which slit with its lateral flanks 72 additionally secures the lines 4, 5 in the crimping position.

Further, the component 73 containing the trough 43 of the guide arrangement **13*d* is vertically slidable in an adapted vertical guide recess 74 and, namely, preferably slidable downward against a spring tension which is capable of restoring it into the starting position. The component 73 is slab-formed and extends perpendicularly in correspondence to the guide recess 74. The appertaining restoring spring is, in the interest of simplification, omitted in the drawing. The component 73 is arranged on outlet side of the guide rail 52, in which arrangement the guide groove 53, likewise opens on the inside, and extends through the component 73. There the arrangement is made in such a way that the upper lateral boundary edge 75 with the adjacent boundary edge 76 of the trough 70 in the lower part 13 form a shear 77 for separating the crimped connector 9 from the strip 51**.

The functioning of the form of execution according to FIGS. 5 and 6 is as follows.

The strip 51 with the connectors 9 is moved forward step-wise by a stroke corresponding to the distance a between the connectors 9 so far that in each case two connectors pass into the trough-shaped counter-bearing 60, 70 which are fitted to the claws. In this position the contact portion 11 of the front first connector 9 is supported on a base 78 projecting upward from the lower part 13 with a flat upper side thereof which is present in the connector feed direction 15 being disposed to the left of the base 78 beside the counter-bearing 70.

In this position the ends to be crimped of the lines 4, 5 are fed by means of a feed arrangement (not shown), in which the lines 4, 5 can be fed oppositely to or at a right angle to the connector feed direction 15. In the lowering of the upper part 12 then, in the area of the crimping station **12*c*, 13*c* the lines 4, 5 are crimped onto the strand claw arms 6, 7 and the insulation sheath claw arms 1, 2 of the front first connector 9, in which process simultaneously the opening-up station 12*a*, 13*a* the aforementioned claws of the second connector are opened up by means of the opening-up stamp 33, 34. Likewise simultaneously in the lowering of the upper part 12 the component 73 is lowered, in which process the crimped front first connector 9 is sheared off by means of the shear 77 from the strip 51 and can then be removed in a manner not represented. After the next feed stroke the opened-up second connector 9 is present in the crimping station 12*c*, 13*c*, so that the aforedescribed process for the crimping and opening-up can occur again. The feed of the strip 51 and the lowering of the upper part 12** occur automatically.

Preferably the guide recess 74 in the lower part 13 is arranged and constructed in such a way that its front boundary edge extending transversely to the connector feed direction 15 is arranged about in the plane of the underside of the guide groove 53. In this formation this boundary edge 81 forms with the front upper boundary edge 82 of the guide groove 53 in the component 73 a further shear 83, on which in the lowering of the component 73 the strip 51 is cut into pieces, which, by reason, of a following oblique surface 84 in the form of a chute, are automatically led off.

The drive for the downward movement of the component 73 is formed preferably by the upper part 12 of the tool, for example by the bearing block 58, which in the lowering strikes against the component 73 and shifts this component 73 downward by a distance corresponding about to the thickness of the strip 51, whereby there occurs the shearing-off of the appertaining connector 9 and of the strip section 51.

I claim:

1. A process for assembling an electrical connector onto two electric wires, said electrical connector being formed from a sheet metal stamping part, said electrical connector having a contact portion and a claw portion, said claw portion including an insulation claw and a strand claw, said two electric wires each being insulated in an end portion, the end portions of said two electric wires being arranged adjacent to each other and being crimped in said insulation and strand claws, said process comprising:

- said electrical connector being a first electrical connector connected to a second electrical connector, and said second electrical connector being connected to other following electrical connectors, all said electrical connectors being connected together by stamping strips, said second and following electrical connectors having same construction as said first electrical connector;
- forming said first, second and following electrical connectors into a band;
- arranging said two electric wires adjacent to each other and feeding said two electric wires to a crimping tool;
- feeding said first electrical connector from said band to said crimping tool;
- positioning said first electrical connector and said end portions of said two electric wires under said crimping tool;
- crimping said end portions of said two electric wires in said insulation and strand claws of said first electrical connector; and
- during said crimping, simultaneously separating said first electrical connector from said band and opening up the insulation and strand claws of said second electrical connector.

2. A process according to claim 1, including arranging said electrical connectors and said stamping strips in a longitudinal direction on said band with respect to each other.

3. A process according to claim 2, including feeding said first electrical connector from said band to one side of said crimping tool, and feeding said two electric wires in a parallel and adjacent arrangement to each other to an opposite side of said crimping tool, said first electrical connector and said two electric wires being fed substantially in same plane.

4. A process according to claim 1, including arranging said stamping strips in direction of feeding of said band, and arranging said electrical connectors on said band transversely to said stamping strips.

5. A process according to claim 4, including joining ends of said electrical connectors of said band to said stamping strips.

6. A process according to claim 4, wherein said electrical connectors are each arranged with the contact portion at one end being connected to the strand claw, and the strand claw being connected to the insulation claw disposed at the opposite end, including joining the insulation claws of said electrical connectors of said band to said stamping strips.

7. A process according to claim 1, wherein said opening up of said insulation and strand claws of said second electrical connector is performed with a stroke tool having a recoiling mechanism for overloading.

8. A process according to claim 7, including a first stroke tool for said insulation claw and a second stroke tool for said strand claw.

9. A process according to claim 8, wherein said first stroke tool includes a rounded fillet, and said second stroke tool includes a wedge, said first and second stroke tools including trough means to provide countersupports for said insulation and strand claws during opening up action of said rounded fillet and said wedge.

10. An apparatus for assembling an electrical connector onto two electric wires, said electrical connector being formed from a sheet metal stamping part, said electrical connector having a contact portion and a claw portion, said claw portion including an insulation claw and a strand claw, said two electric wires each being insulated in an end portion, the end portions of said two electric wires being arranged adjacent to each other and being crimped in said insulation and strand claws, said apparatus comprising:

- a tool including an upper part and a lower part to provide a crimping station for crimping said end portions of said two electric wires in said insulation and strand claws of said electrical connector; and
- an opening-up station disposed in front of said crimping station to open up insulation and strand claws of a following second electrical connector during said crimping at said crimping station.

11. An apparatus according to claim 10, wherein said opening-up station is part of an accessory arrangement for a crimping machine.

12. An apparatus according to claim 11, wherein said accessory arrangement is equipped with a pusher arrangement disposed in front of said opening-up station for feeding connectors from a band.

13. A apparatus according to claim 10, wherein an upper part of said opening-up station includes a slab-form bearing block having a vertical U-shaped slide groove, a strand claw opening-up stamp and an insulation claw opening-up stamp being vertically slidably disposed in said slide groove.

14. An apparatus according to claim 13, wherein said strand claw opening-up stamp includes a lower end portion terminating in a wedge-shaped point, said wedge-shaped point having a wedge angle corresponding to an opening-up angle for said strand claw.

15. An apparatus according to claim 14, wherein said insulation claw opening-up stamp includes a lower end portion terminating in a rounded pin-type fillet, said fillet having an outer contour corresponding to an opening-up contour for said insulation claw.

16. An apparatus according to claim 15, wherein said slide groqve is covered with a side wall to provide a guide shaft closed on all sides, said stamps being guided in said guide shaft.

17. An apparatus according to claim 16, wherein said insulation claw opening-up stamp is disposed in a groove of said side wall, said slide groove and said side wall groove defining said guide shaft.

18. An apparatus according to claim 16, wherein said stamps are only about half as long as said guide shaft with only said wedge-shaped point and said fillet protruding from said guide shaft, a cover covering said guide shaft, and a spring element disposed in an upper portion of said guide shaft, said spring element abutting against said cover and also abutting against said stamps.

19. An apparatus according to claim 18, wherein said spring element is a plug fabricated from a rubber-elastic material.

20. An apparatus according to claim 15, wherein said opening-up station includes a first trough opposite said wedge-shaped point and a second trough opposite said fillet to provide counter-supports, said wedge-shaped point and said first trough serving for the opening-up of said strand claw, and said fillet and said second trough serving for the opening-up of said insulation claw.

21. An apparatus according to claim 13, wherein opening-up elements of said opening-up stamps and crimping elements of said crimping station are arranged transversely next to one another, and a guide arrangement for said two electric wires is arranged on one side of a connector feed direction.

22. An apparatus according to claim 21, wherein a substantially vertically extending component extending transversely to the connector feed direction is disposed in a lower part of said guide arrangement for said two electric wires, said component having a trough open at its top, said component being disposed vertically slidably in a vertical guide recess, said component having a horizontal guide groove extending parallel to the connector feed direction for a connector band, said guide groove being open on an inside of said component and crosses said component in an upper starting position of said component at a feed height of said connector band, an upper boundary edge adjacent to an appertaining counter-bearing of said guide groove in said component forming a shear with an adjacent lower boundary edge of said counter-bearing.

23. An apparatus according to claim 22, wherein a front upper boundary edge of said guide groove in said component extends transversely to said connector feed direction and forms a shear with a parallel-extending upper boundary edge of said guide recess.

24. An apparatus according to claim 22, wherein a plate for covering said trough of said component is secured to an upper part of said guide arrangement for said two electric wires, said plate including a vertical guide slit in alignment with said trough, said guide slit ending on an underside with rounded corners, said guide slit having a width corresponding to approximately a cross-section dimensional sum of said two electric wires.

25. An apparatus according to claim 10, wherein a lower guide arrangement for said two electric wires includes a trough having a flat bottom and vertically, downward-convergent lateral flanks, and an associated upper guide arrangement for said two electric wires includes a presser.

26. An apparatus according to claim 25, wherein said presser is fabricated from a rubber-elastic material and includes a vertically downward-pointing wedge-shaped point for engaging between said two electric wires when said upper part is driven downward for said crimping.

27. An apparatus according to claim 10, wherein said upper and lower parts include many individual members arranged in succession of connector feed direction, said individual members include said opening-up station, a contact area bearing station, said crimping station and a guide arrangement.

28. An apparatus according to claim 10, wherein vertically downward-extending guide bars are arranged on said upper part on an outlet side of said opening-up station, said guide bars slide in a closed linkage in recesses provided in said lower part.

29. An apparatus according to claim 28, wherein a separating knife is provided between said guide bars to cut out a material fillet from a connector band during said crimping, a portion of said guide bars and separating knife forming a side wall of a guide shaft.

30. An apparatus according to claim 28, wherein a bearing station is arranged on an outlet side of said guide bars, an upper part of said bearing station including a vertically downward-extending holding stamp which yields upward against pressure of a spring provided in an accessory arrangement, said holding stamp supporting said contact portion of said connector in closed linkage on a lower part of said bearing station during said crimping.

31. An apparatus according to claim 10, wherein a vertically downward-extending centering stamp having V-shaped centering flanks is disposed between crimping stamps of said crimping station, said centering stamp yielding upward against pressure of a spring provided in an accessory arrangement, said centering stamp holding said connector in a centered position for said crimping.

32. An apparatus according to claim 10, wherein a bearing block is disposed in said upper part of said crimping station, said bearing block being subdivided vertically and transversely to a connector feed direction into two block halves, a vertical inner guide groove extending into both said block halves, crimping and centering stamps being guided in said guide groove.

33. An apparatus according to claim 32, wherein a bearing block of said opening-up station is arranged and secured to a front side, with respect to said connector feed direction, of said bearing block of said crimping station.

34. An apparatus according to claim 33, wherein a vertical receiving groove is provided on said front side of said bearing block of said crimping station, said receiving groove extending into both said block halves, said bearing block of said opening-up station engaging into said receiving groove.

* * * * *

UNITED STATES PATENT AND TRADEMARK OFFICE

CERTIFICATE OF CORRECTION

PATENT NO. : 5,018,270

DATED : May 28, 1991

INVENTOR(S) : FRITZ CAUMANNS

It is certified that error appears in the above-identified patent and that said Letters Patent is hereby corrected as shown below:

Title page, item [22]:

"Feb. 5, 1989" should read --Oct. 5, 1989--.

Signed and Sealed this

Twenty-second Day of September, 1992

*Attest:*

DOUGLAS B. COMER

*Attesting Officer* *Acting Commissioner of Patents and Trademarks*